United States Patent [19]

Kagawa et al.

[11] Patent Number: 4,669,066

[45] Date of Patent: May 26, 1987

[54] MEMORY DATA HOLDING CIRCUIT

[75] Inventors: Yoshimasa Kagawa, Hachioji; Kazushige Nakazono, Hino, both of Japan

[73] Assignee: Fanuc Ltd., Minamitsuru, Japan

[21] Appl. No.: 816,122

[22] PCT Filed: May 10, 1985

[86] PCT No.: PCT/JP85/00265

§ 371 Date: Dec. 31, 1985

§ 102(e) Date: Dec. 31, 1985

[87] PCT Pub. No.: WO85/05475

PCT Pub. Date: Dec. 5, 1985

[30] Foreign Application Priority Data

May 11, 1984 [JP] Japan ................................ 59-94188

[51] Int. Cl.$^4$ ............................................. G11C 13/00
[52] U.S. Cl. ...................................... 365/229; 365/226
[58] Field of Search ................ 365/226, 227, 228, 229

[56] References Cited

U.S. PATENT DOCUMENTS 4,388,706  6/1983  Butler ..................................... 365/226
4,587,640  5/1986  Saitoh ..................................... 365/229

FOREIGN PATENT DOCUMENTS 43-15100  6/1968  Japan .
53-76715  7/1978  Japan .
58-100300 6/1983  Japan .

Primary Examiner—Joseph A. Popek
Attorney, Agent, or Firm—Staas & Halsey

[57] ABSTRACT

A memory data holding circuit for ensuring holding of the stored contents of a memory even if power happens to be turned OFF when the memory is being accessed. A first detecting circuit (2) detects the turning-OFF of the power supply, and a second detecting circuit (7) detects whether a memory (1) is being accessed or not. A switching circuit (8) supplies an operating current from a backup power supply (3) to the memory (1) only when the first detecting circuit (2) detects that the power supply has been turned OFF and the second detecting circuit (7) detects that the memory is not being accessed. An access inhibit means (5, 7) inhibits access to the memory (1) only when the first detecting circuit (2) detects that the power supply has been turned OFF and the second detecting circuit detects that the memory is not being accessed, so that access to the memory (1) is prevented being discontinued before access is completed.

5 Claims, 5 Drawing Figures

MEMORY DATA HOLDING CIRCUIT

BACKGROUND OF THE INVENTION

The present invention relates to a memory data holding circuit which, in case of power supply interruption, supplies an operating current from a backup power supply to a memory to retain its stored data.

A device using a memory is sometimes provided with a data holding circuit which, in case of power source interruption, supplies an operating current from a backup power supply to the memory, preventing destruction of its stored data.

FIG. 5 illustrates in block form an example of a conventional data holding circuit. Reference numeral 1 indicates a memory such as a C-MOS-RAM or the like, 2 a power supply unit which supplies an operating voltage $V_{CC}$ to each part of the device and yields a detecting signal a which goes to a "1" in the power-ON state and a "0" in the power-OFF state, 3 a backup power supply, 4 a changeover switch which is connected to the side of a contact A or B depending upon whether the detecting signal a is at the "1" or "0" level, 5 an AND gate and 6 an input terminal for a chip select signal b. Incidentally, the detecting signal a goes to the "1" state a certain elapsed time after the rise of the operating voltage $V_{CC}$ and goes to the "0" state a certain time before the fall of the operating voltage $V_{CC}$. The memory 1 is accessible when the chip select signal b is at the "1" level which is applied via the AND gate 5.

While the operating voltage $V_{CC}$ is supplied to each part of the device from the power supply unit 2, the detecting signal a is at "1", so the changeover switch 4 will be connected to the contact A side, through which the operating voltage $V_{CC}$ is provided to the memory 1. Furthermore, since the AND gate 5 is in the ON state in this instance, the chip select signal b will be applied via the AND gate 5 to the memory 1. Moreover, when the power supply is turned OFF, the detecting signal a goes to a "0", so the changeover switch 4 is connected to the contact B side and the backup power supply 3 will provide an operating current to the memory 1, holding its stored contents.

With a view to preventing access to the memory 1 during the power-OFF period, however, the conventional arrangement shown in FIG. 5 is adapted so that the chip select signal b is applied to the memory 1 via the AND gate 5 which is controlled by the detecting signal a. This introduces a defect as follows: That is, if power is disconnected from the device when the chip select signal b is at "1" and data is being written in the memory 1, the AND gate 5 will be turned OFF to discontinue the access to the memory 1 although data is being written therein, so that the contents stored at an address being accessed at that time may sometimes become inidentifiable.

SUMMARY OF THE INVENTION

The present invention is intended to overcome such a defect as mentioned above, and has for its object to ensure holding the stored contents of a memory in case of power disconnection.

The present invention includes a first detecting means for detecting the interruption of power supply and a second detecting means for detecting whether the memory is being accessed or not. Only when the first detecting means detects that the power supply is OFF and the second detecting means detects that the memory is not being accessed, access to the memory is prohibited and an operating current is supplied to the memory from a backup power supply. This ensures that the stored contents of the memory are retained even if the power source is turned OFF when the memory is being accessed.

DETAILED DESCRIPTION OF THE PREFERRED EMBODIMENTS

Figure 1:
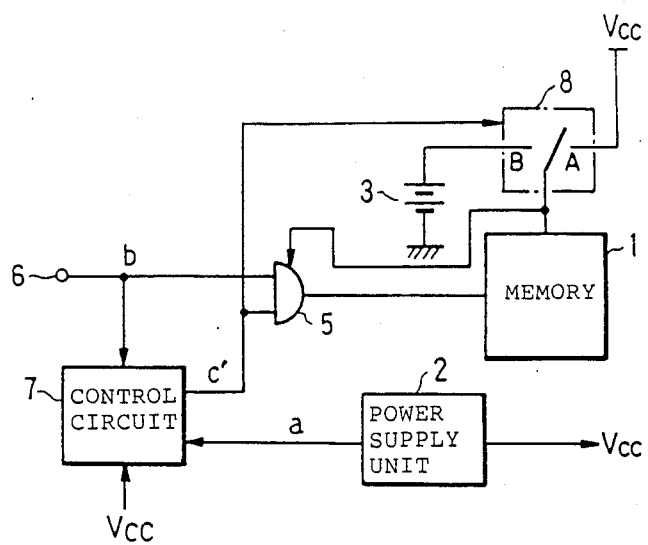
FIG. 1 is a block diagram of an embodiment of the present inventin.
Figure 2:
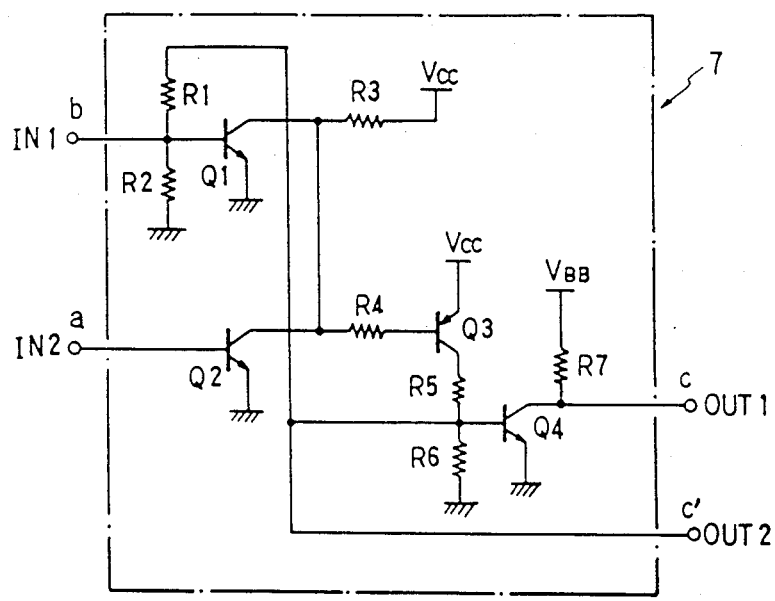
FIG. 2 is a circuit diagram of an example of the arrangement of a control circuit 7 of FIG. 1.
Figure 5:
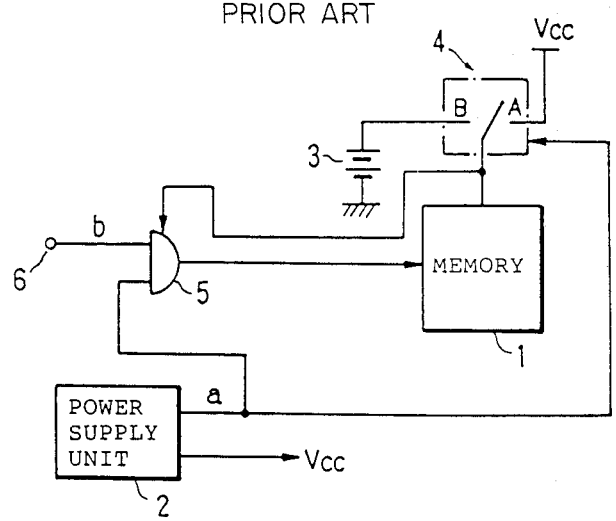
FIG. 5 is a block diagram of a prior art example.

FIG. 1 illustrates in block form an embodiment of the present invention as applied to a system in which the memory 1 is accessible when the chip select signal b is at "1". In FIG. 1 reference numeral 7 indicates a control circuit and 8 a changeover switch which is connected to the contact A or B side depending upon whether an output signal c' of the control circuit 7 is at "1" or "0". The same reference numerals as those in FIG. 5 indicate the same parts. FIG. 2 is a circuit diagram showing an example of the arrangement of the control circuit 7. Reference characters Q1 to Q4 designate transistors, R1 to R7 resistors, IN1 and IN2 input terminals, OUT1 and OUT2 output terminals and $V_{BB}$ an operating voltage from the backup power supply 3. FIGS. 3(A) to (I) are diagrams for explaining the operations of the circuits shown in FIGS. 1 and 2. The control circuit 7 is supplied at the input terminals IN1 and IN2 with the chip select signal b and the detecting signal a, respectively, and the signal c' derived at the output terminal OUT2 is applied to the AND gate 5 and the changeover switch 8. Incidentally, the AND gate 5 is backed up by a battery, and hence is operable even while the power supply is in the OFF state.

Figure 3:
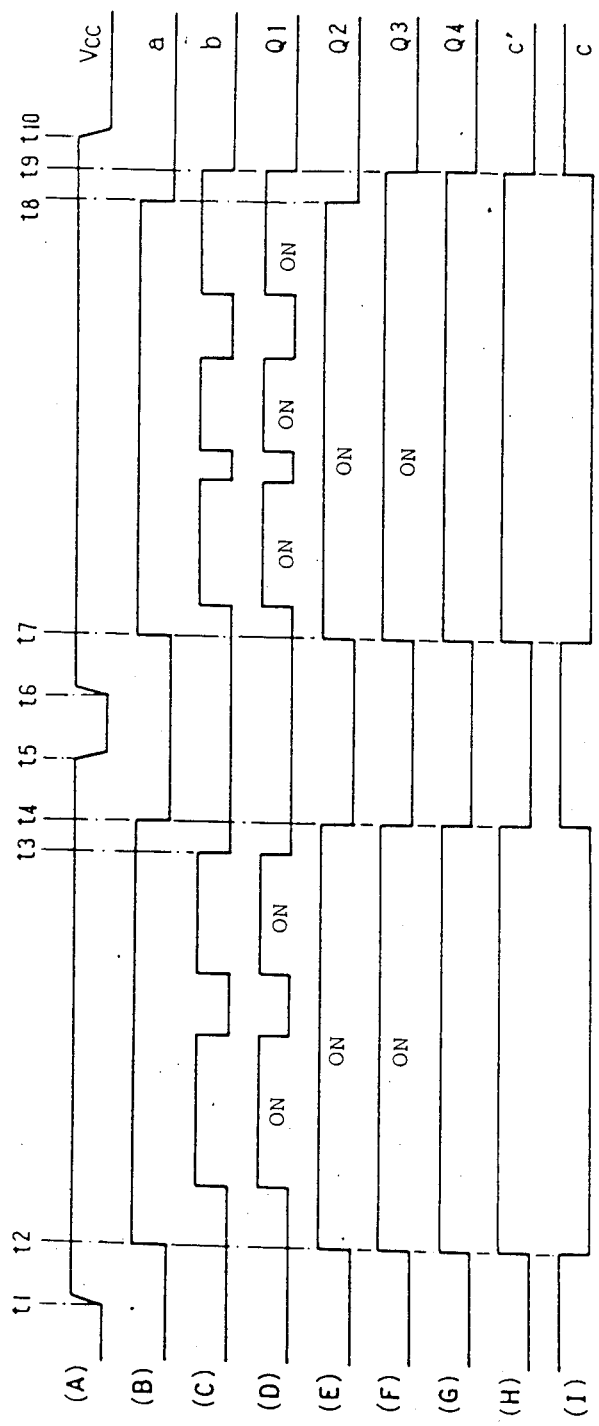
FIG. 3 is a diagram for explaining operations of the circuits depicted in FIGS. 1 and 2.

Now, assuming that the operating voltage $V_{CC}$ and the chip select signal b vary as shown in FIGS. 3(A) and (C), respectively, the detecting signal a available from the power supply unit 2 will go to the "1" state (at times t2 and t7) a certain elapsed time after the rise of the operating voltage $V_{CC}$ (at times t1 and t6) and the "0" state (at times t4 and t8) a certain time before the fall of the operating voltage $V_{CC}$ (at times t5 and t10) as depicted in FIG. 3(B). The transistor Q1 will be turned ON and OFF in response to the "1" and the "0" state of the chip select signal b as shown in FIG. 3(D). Furthermore, since the detecting signal a is at the "1" level from time t2 to t4 and t7 to t8, the transistor Q2 will be in the ON state from time t2 to t4 and t7 to t8 as shown in FIG. 3(E).

Moreover, the transistor Q3 is supplied at its base with current via either one of the transistors Q1 and Q2 if that one of them is in the ON state, so it will be in the ON state from time t2 to t4 and t7 to t9 as shown in FIG. 3(F). When the transistor Q3 is in the ON state, the transistor Q4 is supplied at its base with current, and hence will be in the ON state from time t2 to t4 and t7 to t9 as depicted in FIG. 3(G). Consequently, the signal c' which is provided at the output terminal OUT2 will be at the "1" level from time t2 to t4 and t7 to t9 as depicted in FIG. 3(H), and the signal c from the output terminal OUT1 will be at the "0" level from time t2 to t4 and t7 to t9 as shown in FIG. 3(I).

Accordingly, when the detecting signal a happens to go to the "0" level at time t4, since the signal c changes from the "1" to the "0" level at time t4, the AND gate 5 will be turned OFF at time t4 to thereby inhibit access to the memory 1 and, at the same time, the changeover switch 8 will be connected to the contact B side, supplying operating current to the memory 1 from the backup power supply 3. In the case where the detecting signal a happens to be a "0" at time t8, since the transistor Q3 remains in the ON state until time t9, that is, until the chip select signal b goes to a "0", as shown in FIG. 3(F), the signal c' from the output terminal OUT2 will fall from the "1" to the "0" level at time t9 and the AND gate 5 will be turned OFF at time t9, prohibiting access to the memory 1. At the same time, the changeover switch 8 will be connected to the contact B side, supplying operating current to the memory 1 from the backup power supply 3. In addition, even if the chip select signal b goes to a "1" again afterward, the transistor Q1 will not be turned ON since the transistor Q3 for supplying the base current to the transistor Q1 is already in the OFF state.

That is, the control circuit 7 will immediately make the signal c' a "0" if the detecting signal a goes to the "0" state when the memory 1 is not being accessed (at time t4), and if the detecting signal a goes to the "0" state when the memory 1 is being accessed (at time t8), the control circuit will make the signal c' a "0" upon completion of access to the memory 1 (at time t9). Accordingly, even if the power supply is turned OFF when data is being written in the memory 1, the gate circuit 5 will remain in the ON state until access to the memory 1 is completed, so that the stored contents at the address being accessed at that time will not become unidentifiable.

Figure 4:
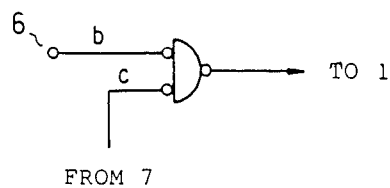
FIG. 4 is a diagram of the principal part of another embodiment of the present invention.

While the above embodiment has been described in connection with the case where the present invention is applied to the system in which the memory 1 is accessed when the chip select signal b is at the "1" level, the invention is applicable as well to a system in which the memory 1 is accessed when the chip select signal b is at the "0" level. In such a case, it is necessary only to provide the chip select signal b via an inverter to the input terminal IN1 of the control circuit 7 and to employ, in place of the AND gate 5, a gate circuit which receives the chip select signal b and the signal c from the output terminal OUT1 of the control circuit 7 and provides an output signal "0" only when both input signals are at the "0" level (see FIG. 4). Furthermore, although in the above embodiment it is determined, based on the chip select signal b, whether the memory 1 is being accessed or not, it is also possible, of course, to use a write signal for deciding whether the memory 1 is being accessed or not.

As described above, the present invention is provided with a first detecting means (formed by the power supply unit 2 in the embodiment) for detecting that the power supply is turned OFF, a second detecting means (formed by the transistor Q1, etc. in the embodiment) for detecting whether a memory is being accessed or not, a switching means (formed by the changeover switch 8, the transistor Q3, etc. in the embodiment) for supplying an operating current from a backup power supply when the first detecting means detects that the power supply has been turned OFF and the second detecting means detects that the memory is not being accessed, and an access inhibit means (formed by the AND gate 5, the transistor Q3, etc. in the emodiment) for inhibiting access to the memory when the first detecting means detects that the power supply has been turned OFF and the second detecting means detects that the memory is not being accessed. Accordingly, the present invention possesses the advantage that even if the power supply is turned OFF when data is being written in the memory, the stored contents at the address being accessed at that time will not become unidentifiable unlike in the prior art.

What is claimed is:

1. A memory data holding circuit which, in case of power supply interruption, supplies an operating current to a memory from a backup power supply, comprising:

first detecting means for detecting that the power supply is turned OFF;

second detecting means for detecting whether the memory is being accessed or not, said second detecting means including a first transistor connected to receive a chip select signal, so that said first transistor is turned ON when the chip select signal is at a first logic level for accessing the memory;

switching means for supplying the operating current to the memory from the backup power supply when said first detecting means detects that the power supply has been turned OFF and said second detecting means detects that the memory is not being accessed; and access inhibit means for inhibiting access to the memory when said first detecting means detects that the power supply has been turned OFF and said second detecting means detects that the memory is not being accessed.

2. A memory data holding circuit according to claim 1, wherein said first detecting means generates a detecting signal indicating whether the power supply is turned OFF, and wherein said switching means comprises:

a second transistor coupled to said first detecting means, said second transistor being turned ON and OFF in dependence upon the detecting signal;

a third transistor, coupled to said first and second transistors, for providing an output signal in dependence upon whether said first and second transistors are ON or OFF; and a changeover switch, coupled to said third transistor, for supplying the operating current to the memory from the backup power supply in dependence upon the output signal from said third transistor.

3. A memory data holding circuit according to claim 2, wherein said access inhibit means comprises an AND gate connected to receive the chip select signal and the output signal from said third transistor, said AND gate having an output connected to the memory.

4. A memory data holding circuit according to claim 3, wherein said first detecting means comprises a power supply unit connected to said second transistor.

5. A memory data holding circuit for supplying an operating current to a memory from a backup power supply in case of power supply interruption, comprising:

a power supply unit for providing power and for generating a detecting signal when the power supply is turned OFF;

a control circuit, coupled to said power supply unit and connected to receive a chip selection signal when the memory is to be accessed, for receiving the detecting signal and for generating an output signal in dependence upon the chip selection signal and the detecting signal, said control circuit including:
  a first transistor connected to receive the chip select signal;
  a second transistor connected to said power supply unit to receive the detecting signal; and
  a third transistor, coupled to said first and second transistors, for receiving, as an input, the outputs of said first and second transistors, and for providing the output signal;

a changeover switch, coupled to said third transistor, the backup power supply, said power supply unit and the memory, for providing power from either said power supply unit or the backup power supply in dependence upon the output signal from said third transistor;

a gate having a first input connected to receive the chip select signal, having a second input connected to receive the output signal from said third transistor, and having an output connected to the memory, the output signal generated by said control circuit causing said gate to inhibit access to the memory when the detecting signal indicates that the power supply has been turned OFF and the chip select signal indicates that the memory is not being accessed.

* * * * *